United States Patent [19]

Anani et al.

[11] Patent Number: 5,434,022
[45] Date of Patent: Jul. 18, 1995

[54] ELECTRODES AND ELECTROCHEMICAL STORAGE CELLS UTILIZING TIN-MODIFIED ACTIVE MATERIALS

[75] Inventors: Anaba Anani, Lauderhill, Fla.; John Johnson, Calverton, N.Y.; Hong S. Lim, Agoura Hills, Calif.; James Reilly, Bellport, N.Y.; Ricardo Schwarz, Los Alamos, N. Mex.; Supramaniam Srinivasan, College Station, Tex.

[73] Assignees: Hughes Aircraft Company, Los Angeles, Calif.; The Texas A&M University System, College Station, Tex.; The Regents of the University of California, Oakland, Calif.; Associated Universities, Inc., Upton, N.Y.

[21] Appl. No.: 133,495

[22] Filed: Oct. 8, 1993

[51] Int. Cl.$^6$ .............................................. H01M 4/58
[52] U.S. Cl. .................................. 429/218; 429/223; 420/455; 420/900
[58] Field of Search ............... 429/101, 206, 218, 223, 429/209; 252/182.1; 420/441, 455, 580, 589, 900; 423/644

[56] References Cited

U.S. PATENT DOCUMENTS

| | | | |
|---|---|---|---|
| 4,004,943 | 1/1977 | Boter . | |
| 4,233,347 | 11/1980 | Lim et al. . | |
| 4,269,913 | 5/1981 | Lim et al. . | |
| 4,487,817 | 11/1984 | Willems et al. . | |
| 4,551,400 | 11/1985 | Sapru et al. . | |
| 4,637,967 | 1/1987 | Keem et al. . | |
| 4,946,646 | 8/1990 | Gamo et al. . | |
| 5,278,001 | 1/1994 | Ono et al. | 429/101 |
| 5,281,390 | 1/1994 | Gamo et al. | 420/422 |
| 5,304,345 | 4/1994 | Fujitami et al. | 420/455 |
| 5,304,435 | 4/1994 | Jones | 429/101 |

OTHER PUBLICATIONS

A. Anani et al., "Characterization of Sn-modified AB$_5$ alloy for hydrogen storage and battery applications", Abstract No. 64 of presentation at Fall Electrochemical Society Meeting, Oct. 11-16, 1982 (1 page).

A. Anani et al., "Mechanically alloyed hydrogen storage materials with high gas phase and electrochemical storage capacities", Abstract of presentation at Spring Electrochemical Society meeting, May 16-21, 1993 (1 page abstract).

A. Anani et al., "Mechanically alloyed hydrogen storage materials with high gas phase and electrochemical storage capacities", Extended Abstract of Presentation at Spring Electrochemical Society meeting, May 16-21, 1993 (2 pages).

Konstantin Petrov, Amaldo Visintin, et al., "Optimization of composition and structure of metal hydride electrodes for electric vehicle applications", Abstract of presentation at Spring Electrochemical Society meeting, May 16-21, 1993 (1 page).

Konstantin Petrov, Amaldo Visintin, et al., "Optimization of composition and structure of metal hydride electrodes", Extended Abstract of presentation at Spring Electrochemical Society meeting, May 16-21, 1993 (2 pages).

Konstantin Petrov, Abbes Rostami, et al., "Optimization of Composition and Structure of Metal-Hydride Electrodes", preprint of paper presented at 1993 Electrochemical Society Fall Meeting, Oct. 11, 1993.

*Primary Examiner*—Anthony Skapars
*Attorney, Agent, or Firm*—Elizabeth E. Leitereg; Terje Gudmestad; W. K. Denson-Low

[57] ABSTRACT

An electrode has a substrate and a finely divided active material on the substrate. The active material is ANi$_{x-y-z}$Co$_y$Sn$_z$, wherein A is a mischmetal or La$_{1-w}$M$_w$, M is Ce, Nd, or Zr, w is from about 0.05 to about 1.0, x is from about 4.5 to about 5.5, y is from 0 to about 3.0, and z is from about 0.05 to about 0.5. An electrochemical storage cell utilizes such an electrode as the anode. The storage cell further has a cathode, a separator between the cathode and the anode, and an electrolyte.

27 Claims, 3 Drawing Sheets

ELECTRODES AND ELECTROCHEMICAL STORAGE CELLS UTILIZING TIN-MODIFIED ACTIVE MATERIALS

This invention relates to electrochemical storage cells, and, more particularly, to the composition of an anode for a Ni/MHx cell.

Rechargeable electrochemical storage cells or batteries are electrochemical devices for storing and retaining an electrical charge and later delivering that charge for useful power. Familiar examples of the rechargeable cell are the lead-acid cell used in automobiles and the nickel-cadmium cell used in various portable electronic devices. Other types of cells having a greater storage capacity for their weight and volume include those based upon the reduction and oxidation of nickel oxide at a cathode, and the corresponding oxidation and reduction of hydrogen at an anode. Such cells are desirably used in weight-critical, long-life applications such as the batteries in spacecraft. One familiar cell based upon this electrochemistry is the nickel oxide/pressurized hydrogen cell.

Another type of cell under development is the nickel/metal hydride cell (also known generically in the art as the "Ni/MHx cell"), which has the advantage that a pressurized container is not required because the anode reaction product is a solid rather than a gas. At the anode of the nickel/metal hydride cell, a reversible electrode reduction reaction of water at the surface of a metal alloy (the "active material") produces a solid metal hydride and hydroxide ion. The active material of the anode is a participant in this reaction, with minimal loss of effectiveness during extended periods of use and many charging and discharging cycles. The active material desirably also can be provided in a form having a high surface area when supported upon an anode substrate, to provide a large reaction surface area at the anode. The metal hydride has, in general, a different volume than the corresponding metal. The anode is therefore subjected to volumetrically induced strains during cycling. The anode structure and material must resist failures during these cycles.

One of the types of anode active materials is the $AB_5$ class of metals and its modified forms. For example, $LaNi_5$ has long been known as an operable anode active material. $LaNi_5$ exhibits the desired chemical-reaction and hydrogen-storage properties. $LaNi_5$ is, however, mechanically brittle and chemically unstable during extended use in an electrochemical cell. When used as the active material of an anode, $LaNi_5$ disintegrates and/or forms surface oxides during extended use, so that it loses its effectiveness as the active material.

There have been a number of approaches to improving the properties of $AB_5$-class metals in order to utilize their desirable active-material properties while avoiding or minimizing the undesirable characteristics. Composition modifications to the active material, improved electrode fabrication techniques, and surface pretreatments have all been effective to some degree.

There remains the need for improved anodes for use in Ni/MHx electrochemical cells. Such improved anodes and cells would have good initial performance, maintain a good level of performance over extended periods of use and many cycles of charge and discharge, and be mechanically and chemically stable in the electrochemical environment of the cell. The present invention fulfills this need, and further provides related advantages.

SUMMARY OF THE INVENTION

The invention provides a modified $AB_5$-type active material, an electrode using the active material, and an electrochemical cell that incorporates an anode with the active material. The electrode and cell exhibit good initial performance which is degraded relatively slowly with increasing numbers of cycles of charging and discharging. The loss of capacity with repeated cycling is relatively small. The electrode made with the active material of the invention is dimensionally stable during extended periods of use, and does not lose its mechanical integrity.

In accordance with the invention, an electrode comprises a substrate, and an active material in a finely divided form supported on the substrate. The active material comprising $ANi_{x-y-z}Co_ySn_z$, wherein A is a mischmetal (abbreviated Mm) or $La_{1-w}M_w$, M is Ce, Nd, or Zr, or mixtures thereof, w is from about 0.05 to about 1.0, x is from about 4.5 to about 5.5, y is from 0 to about 3, and z is from about 0.05 to about 0.5.

An electrochemical cell in accordance with the invention utilizes as an anode the electrode as described above, a cathode, a separator between the anode and the cathode, and an electrolyte.

The active material is a tin-modified $LaNi_5$ metal, wherein some of the lanthanum is replaced by cerium, neodymium, or zirconium, or by mischmetal, and some of the nickel can be replaced by cobalt as well as the required tin. This active material has good hydrogen storage and reaction properties when used in the anode of a Ni/MHx cell, and is mechanically stable during cycles of charge and discharge. Within the composition range of the active material as defined above, several compositions have been identified as being of most interest. These compositions include $La_{0.8}Ce_{0.2}Ni_{4.8}Sn_{0.25}$, $La0.8Ce_{0.2}Ni_{4.7}Co_{0.4}Sn_{0.2}$, $La_{0.8}Nd_{0.2}Ni_{4.7.5}Co_{0.5}Sn_{0.25}$, $La_{0.8}Ce_{0.2}Ni_{3.5}Co_{1.2}Sn_{0.25}$, $La_{0.8}Zr_{0.2}Ni_{3.5}Co_{1.2}Sn_{0.25}$, and $MmNi_{4.8}Sn_{0.25}$.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
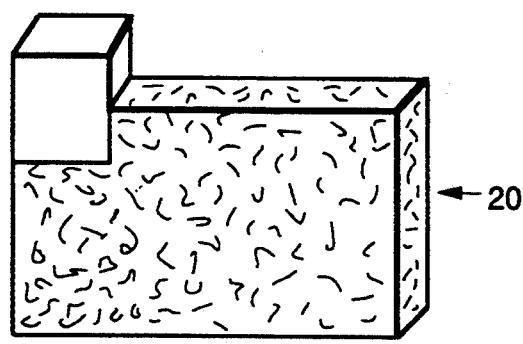
FIG. 1 is a perspective view of an electrode prepared by the process of the invention.

In accordance with the invention, an electrode active material is a Sn-modified AB5 metal of the form $ANi_{x-y-z}Co_ySn_z$, wherein A is a mischmetal or $La_{1-w}M_w$, M is selected from the group Ce, Nd, and Zr, w is from about 0.05 to about 1.0, x is from about 4.5 to about 5.5, y is from 0 to about 1.5, and z is from about 0.05 to about 0.5. (All subscript values herein are in atomic ratios and values.)

Mischmetal (abbreviated Mm) is a naturally occurring mixture of rare earth elements, and is therefore more economic than combinations of pure elements. The mischmetal contains La, Ce, and Nd as main components. A typical composition of the mischmetal is approximately 25 percent La, approximately 50 percent Ce, approximately 19 percent Nd, and approximately 6 percent Pr. Lanthanum-enriched mischmetal, which is within the scope of the general term "mischmetal", contains approximately 44 percent La, 29 percent Ce, 21 percent Nd, and 6 percent Pr.

Within the indicated range, the following compositions are preferred: $MmNi_{4.8}Sn_{0.25}$, $La_{0.8}Ce_{0.2}Ni_{4.8}Sn_{0.25}$, $La_{0.8}Ce_{0.2}Ni_{4.7}Co_{0.4}Sn_{0.25}$, $La_{0.8}Nd_{0.2}Ni_{4.35}Co_{0.5}Sn_{0.25}$, $La_{0.8}Ce_{0.2}Ni_{3.5}Co_{1.2}Sn_{0.25}$, and $La_{0.8}Zr_{0.2}Ni_{3.5}Co_{1.2}Sn_{0.25}$. Of these compositions, $La_{0.8}Ce_{0.2}Ni_{4.8}Sn_{0.25}$ is most preferred and will be discussed in relation to the preferred embodiments.

In the general compositional formulation, $La_{1-w}M_wNi_{x-y-z}Co_ySn_z$, M may be Ce, Nd, or Zr, and mixtures thereof. The substitution of Ce and Nd imparts good capacity to the active material and good stability during cycling. Zr improves the mechanical stability of the active material upon cycling. The value of w expresses the amount of the M substitution that is present. If w is less than about 0.05, the substitution is ineffective. If w is more than about 1, the resulting product will not be an AB5 type of alloy.

The value of x expresses the basic range of the nickel content around the nominal value of 5 required in the AB5 alloy. If x is less than about 4.5 or more than about 5.5, the AB5 character of the active material is lost.

The value of z expresses the addition of tin as a substitution for some of the nickel that is particularly valuable in improving the properties of the active material of the invention. The tin produces a beneficial effect on the active material in combination with the cerium, neodymium, and zirconium. The tin also improves the cycle life of the active material. The presence of tin improves cycle life of the active material. If the value of z is below about 0.05, the tin addition is ineffective. If the value of z is more than about 0.5, the combined effects of the Sn, Ce, Nd, and Zr do not produce a practically useful active material. The value of z should not exceed 0.5 because the more tin you add you reduce the amount of hydrogen the alloy will absorb, thereby reducing the energy density of the electrode and ultimately its energy storage capacity.

The value of y expresses an optional substitution of cobalt for some of the nickel. The cobalt has the effect of improving mechanical stability of the alloy during charging and discharging cycling. The active material may contain no cobalt, but y may be as large as about 3.0. If y is more than about 3.0, the active material does not have a practically useful electrode capacity.

The active material is prepared from the required constituents in the desired amounts, either in elemental or prealloyed form. There are several ways to form the active material from these constituents. Button arc melting, a well known technique, may be used. In this approach, the constituents are placed into a water-cooled hearth. An atmosphere, preferably argon gas, is maintained. An arc-producing electrode is positioned immediately above the constituents, power is applied to the electrode, and an arc is struck to the hearth and the constituents. The constituents are melted, sometimes with difficulty initially, and mixed together. Power is removed, and the mixture allowed to cool. The resulting mass is termed a button from its shape. In conventional practice, the button is turned and remelted, typically at least several times, to achieve a homogeneous mass of material.

In one alternative approach that is more useful than button arc melting for preparing large quantities of the active material, the constituents are induction melted.

Regardless of how it is produced, the active material is processed to a finely divided form for use in an electrode. The finely divided form is utilized because it can be readily supported on a substrate and has a high surface area for reaction. The active material is typically prepared to a size of about 30–80 micrometers. In the arc melting or induction melting techniques, after melting the homogeneous button is mechanically pulverized to a finely divided form. Where mechanical alloying is used, the active material produced by the ball milling operation is already in a finely divided form.

Figure 2:
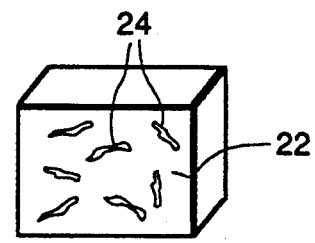
FIG. 2 is an enlarged portion of a region of the electrode of FIG. 1.

In the preferred embodiment, the active material is used to form an electrode, and specifically an anode 20 (FIGS. 1–2). To prepare the anode, a substrate 22 is provided. The anode substrate 22 is preferably a highly porous, chemically inert, electrically conductive material having a large amount of surface area per unit volume of material and pores sufficiently large to allow easy penetration of the alloy particles in paste form. The anode substrate is also desirably somewhat compliant to partially absorb volumetric changes during charging and discharging of the electrochemical cell. In the preferred approach, the anode substrate is made of nickel in the form of a sponge similar in form and appearance to a conventional household sponge. The anode may also be made in the form of perforated material, felt, metal strands, metal mesh or other forms.

The active material, indicated by numeral 24, is supported on the substrate 22. Like most AB5 compounds, the preferred active material compositions are not readily sintered. To support the material on the substrate, a hot melt technique is preferred, but a polymer solution technique can also be used.

In the hot melt technique, the finely divided active material is mixed with a small amount of a polymeric material such as polytetrafluoroethylene, also sometimes termed teflon. The mixture is heated to a temperature at which the polymeric material softens while the mixture is pressed into the anode substrate 22, forming an active material mass supported on and bonded to the substrate 22.

In the polymer solution technique, a polymer is dissolved in an organic solvent. The active material is mixed into this solution, forming a slurry having a consistency like that of toothpaste. The slurry is coated onto the substrate 22. The polymer forms a three-dimensional network that anchors the active material to the substrate.

In either approach for preparing adhering the active material to the anode substrate, electrically conductive particles such as metals (e.g., copper) or nonmetals (e.g., carbon or graphite) may be included in the mixture before it is applied to the substrate. These conductive particles decrease the resistance of the active material on the anode substrate. The mixture of active material and conductive particles is typically from about 95 to 100 weight percent active material and 5 to 0 weight percent conductive particles, more preferably from about 95 to 97 weight percent active material and 5 to 3 weight percent conductive particles.

At this point of the processing an anode 20 is complete. This anode functions by reaction of the active material according to the relation $$1/x\ R + H_2O + e^- = 1/x\ RH_x + OH^-$$

where R represents the active material.

Figure 3:
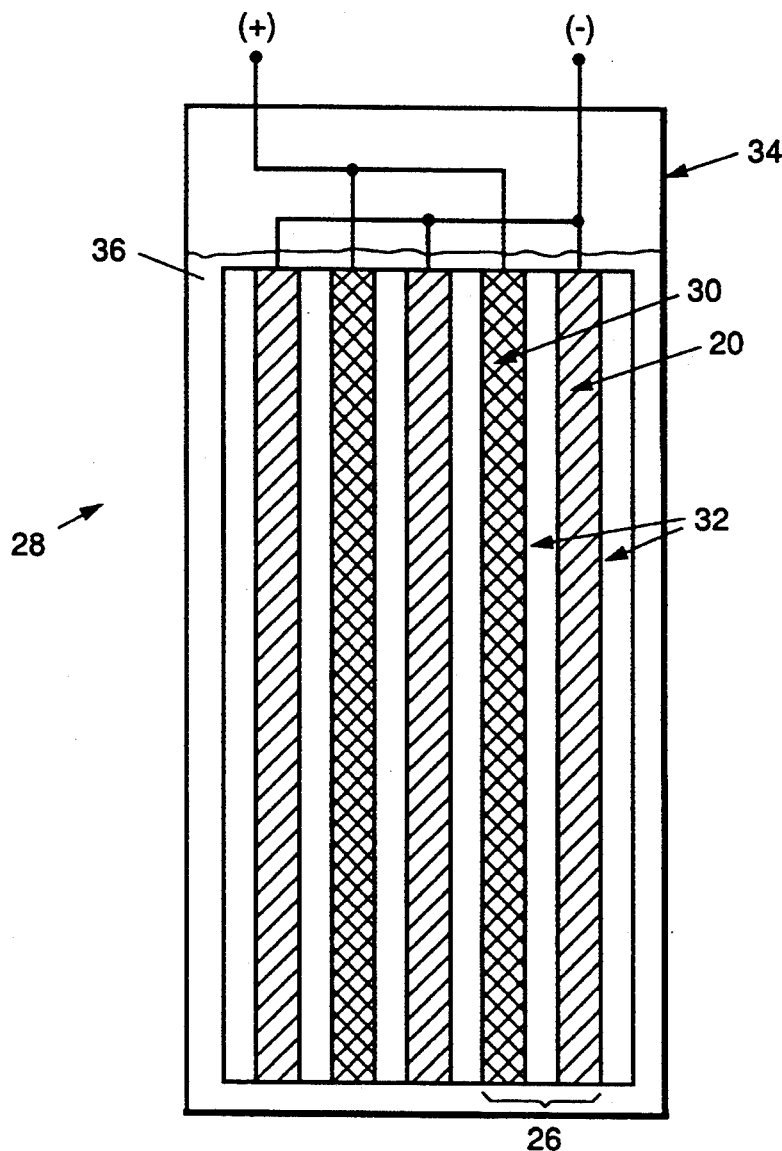
FIG. 3 is a schematic view of an electrochemical storage cell prepared by the process of the invention.

The following discussion relates to the preparation of a basic unit of the cell 26 and an associated battery cell 28, FIG. 3, utilizing this anode.

A cathode 30 is prepared with any operable structure and in any operable manner. In a preferred approach, a typical nickel oxide/hydroxide cathode is prepared by impregnation of $Ni(OH)_2$ in the pores of a porous nickel substrate either by a chemical or an electrochemical means from a nickel nitrate solution containing about 5 to 10 percent of cobalt nitrate solution. A preferred cathode active material contains about 5 to 10 percent of cobalt of the total of nickel and cobalt. In the electrochemical cell, the cathode functions according to the reversible reaction $$NiOOH + H_2O + e^- = Ni(OH)_2 + OH^-$$

A separator 32 is provided. The separator material is an electrically nonconductive porous material that isolates cathodes from anodes electrically to avoid shorts, yet retains a sufficient amount of electrolyte to form an electrochemical cell. The separator material must have the following additional characteristics. It should be sufficiently stable chemically in the alkaline battery electrolyte to last throughout the service lifetime without producing a detrimental deleterious effect by its reaction products. It should retain a sufficiently large amount of electrolyte to provide a good ionic conductivity through the separator. For an electrolyte starved sealed cell, the separator should have a sufficient amount of large pores which are not filled with electrolyte for oxygen gas to pass from the cathode to the anode to achieve a good oxygen recombination capability. The oxygen is evolved from the cathode during the overcharge of the cell as an undesirable by-product of charging the cathode. Operable separators are commercially available nylon or polypropylene felt materials having a thickness of about 150 to about 250 micrometers and which are typically made of monofilament polymer fiber of about 20 micrometers or less in diameter. A preferred separator material, provided that cost is less important than performance, such as for spacecraft applications, is a woven zirconia fabric mechanically reinforced with a polymer, which has superior electrolyte retention to the organic felt material.

The anode 20, cathode 30, and separator 32 are assembled together with the separator between the anode and the cathode, to form the basic unit of the storage cell 26. Considering the above-indicated anode and cathode reactions, the electrochemical cell operates according to the reversible reaction $$1/x\ RH_x + NiOOH = 1/x\ R + Ni(OH)_2.$$

Each such basic storage cell 26, when immersed into an electrolyte, exhibits a characteristic voltage, capacity, and current flow. To obtain higher voltages, capacities, and current flows, more than one such basic storage cell 26 is used. FIG. 3 depicts several basic storage units 26 connected in parallel to form the battery 28.

The storage cells 26 are placed into a container 34, and an electrolyte 36 is added. A preferred alkali electrolyte is a 20–40 percent, more preferably a 26–31 percent, and most preferably a 31 percent, aqueous solution of potassium hydroxide (KOH). The previously discussed polymers used in the preparation of the anode 20 exhibit long-term stability in such an electrolyte solution.

The following examples illustrate aspects of the invention. They should not be interpreted as limiting of the invention in any respect.

EXAMPLE 1

Three test anodes were fabricated, each using about 1.1 grams of the hydride-forming metal alloy $La_{0.8}Ce_{0.2}Ni_{4.8}Sn_{0.25}$ and the preferred fabrication techniques discussed previously. The polymer solution technique was used to adhere the active material to the anode. The anodes had about 1 square inch of surface area. Test cells were prepared by sandwiching the respective test anodes between two sets of separators and nickel oxide electrodes, and immersing the cells into a 31 percent aqueous solution of KOH, thereby forming a Ni/MHx electrochemical cell.

These electrodes had measured storage capacities of up to 312 mAh/g (milliampere hours per gram) of the metal alloy. In a separate measurement it was determined that the anodes had a gaseous hydrogen absorption capacity of about 335 mAh/g. The close correspondence of the storage capacity and the hydrogen absorption capacity indicated that the metal active material had a high utilization of about 93 percent, a desirable feature of the storage cell.

The gravimetric and volumetric energy densities of this type of cell are projected to be about 30 percent greater than for an otherwise comparable Ni/Cd cell. Moreover, cadmium is a material that is environmentally hazardous, while the present cell utilizes no such hazardous material. The Ni/MHx cell will therefore be preferred to a Ni/Cd cell for many applications.

EXAMPLE 2

Figure 4:
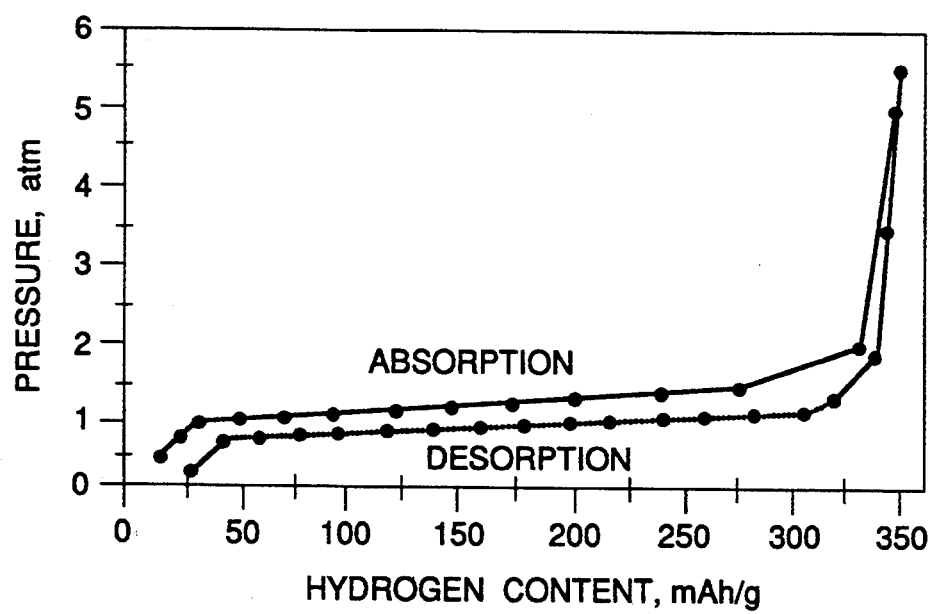
FIG. 4 is a graph of pressure as a function of hydrogen content of the active material during absorption and desorption of hydrogen.

The pressure-composition isotherms for hydrogen absorption/desorption of the active material used in the anodes in Example 1 were measured. A typical result is shown in FIG. 4.

EXAMPLE 3

Figure 5:
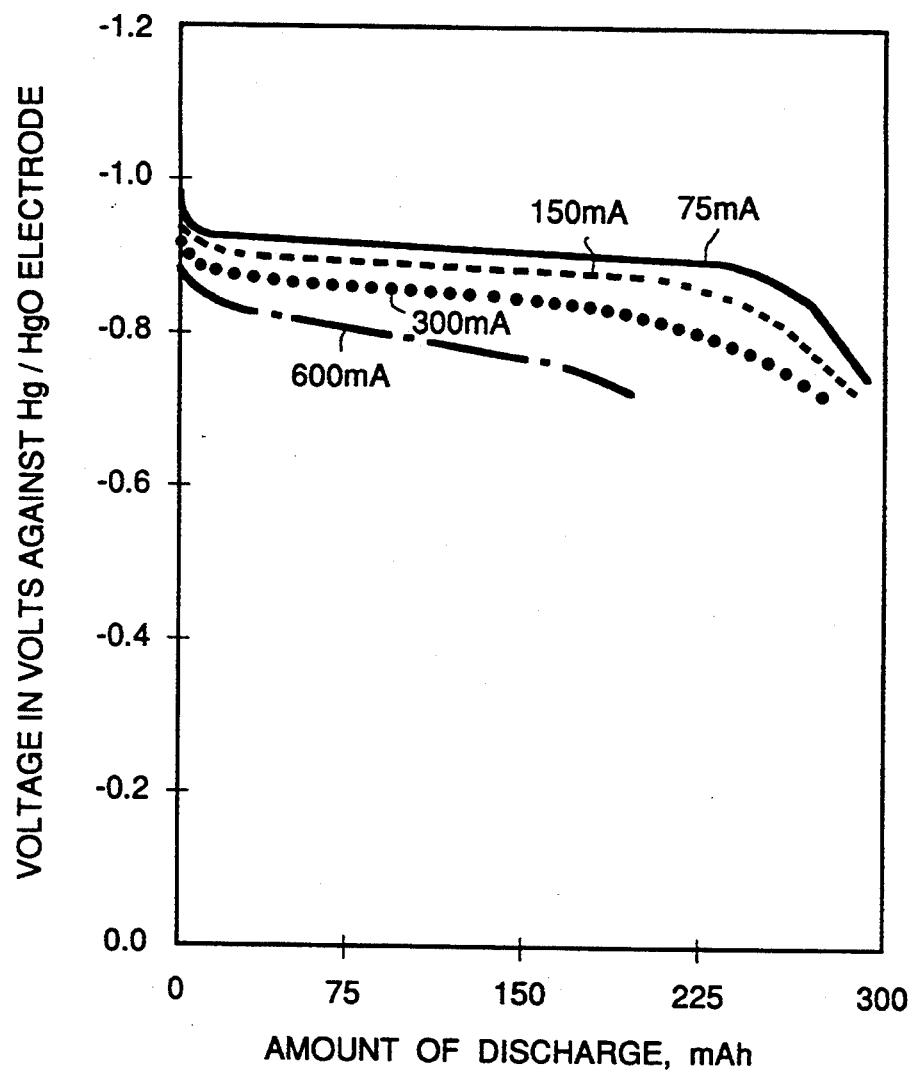
FIG. 5 is a graph of voltage loss as a function of amount of discharge, for various current flows, for the electrode made according to the invention.

The three cells prepared in Example 1 were studied for their discharge rate capability at various discharge rates. FIG. 5 illustrates the discharge behavior in terms of the output voltage as a function of amount (degree) of discharge, for various discharge rates. There is a relatively small voltage loss as a function of both the amount of discharge and the rate of discharge. These characteristics are generally as good as, or better than, a high performance cadmium electrode for an aerospace Ni/Cd cell.

EXAMPLE 4

Figure 6:
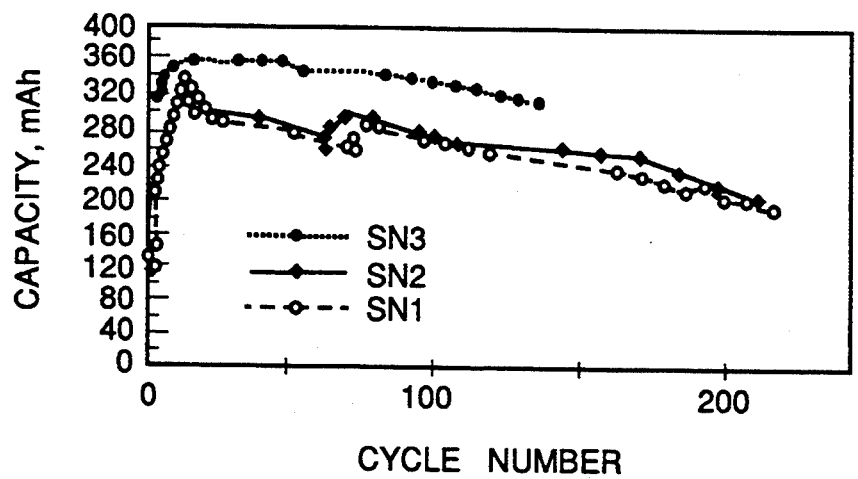
FIG. 6 is an electrochemical cell storage capacity as a function of number of charge/discharge cycles for electrochemical cells made according to the invention.

The three cells prepared for Example 1 were subjected to repeated cycles of charging and discharging. The capacity of the cells was measured every few cycles. FIG. 6 shows the capacity as a function of number of cycles for the three cells. After an initial breaking period, there is a slow decrease in the storage capacity. Again, the reduction is comparable with, or less than, that experienced for cadmium electrodes used in Ni/Cd cells. There is no catastrophic reduction in cell properties due to disbonding of active material or other mechanism. Long term cycleability is expected to be improved even further, as by coating the active material with a thin layer of nickel.

The present approach provides an advance in the art of electrochemical storage cells. The electrode and storage cell of the invention are inexpensively produced, have excellent charging and discharging characteristics, and are resistant to degradation mechanisms. Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An electrode, comprising:
   a substrate; and
   an active material in a finely divided form supported on the substrate, the active material comprising $ANi_{x-y-z}Co_ySn_z$, wherein A is selected from mischmetal or $La_{1-w}M_w$, M is selected from the group Ce, Nd, Zr, and mixtures thereof, w is from about 0.05 to about 1.0, x is from about 4.5 to about 5.5, y is from 0 to about 3.0, and z is from about 0.05 to about 0.5.

2. The electrode of claim 1, wherein the substrate is made of nickel.

3. The electrode of claim 1, wherein the substrate is in the form of a sponge.

4. The electrode of claim 1, wherein the active material is $La_{0.8}Ce_{0.2}Ni_{4.8}Sn_{0.25}$.

5. The electrode of claim 1, wherein the active material is $La_{0.8}Ce_{0.2}Ni_{4.7}Co_{0.4}Sn_{0.25}$.

6. The electrode of claim 1, wherein the active material is $La_{0.8}Nd_{0.2}Ni_{4.75}Co_{0.5}Sn_{0.25}$.

7. The electrode of claim 1, wherein the active material is $La_{0.8}Ce_{0.2}Ni_{3.5}Co_{1.2}Sn_{0.25}$.

8. The electrode of claim 1, wherein the active material is $La_{0.8}Zr_{0.2}Ni_{3.5}Co_{1.2}Sn_{0.25}$.

9. The electrode of claim 1, wherein the active material is $MmNi_{4.8}Sn_{0.25}$.

10. An electrochemical storage cell, comprising:
    an anode comprising
        an anode substrate, and
        an active material in a finely divided form supported on the anode substrate, the active material comprising $ANi_{x-y-z}Co_ySn_z$, wherein A is selected from mischmetal or $La_{1-w}M_w$, M is selected from the group Ce, Nd, Zr, and mixtures thereof, w is from about 0.05 to about 1.0, x is from about 4.5 to about 5.5, y is from 0 to about 3.0, and z is from about 0.05 to about 0.5;
    a cathode;
    a separator disposed between the anode and the cathode; and
    an electrolyte disposed to transmit current between the cathode and the anode.

11. The storage cell of claim 10, wherein the anode substrate is made of nickel.

12. The storage cell of claim 10, wherein the anode substrate is in the form of a sponge.

13. The storage cell of claim 10, wherein the active material is $La_{0.8}Ce_{0.2}Ni_{4.8}Sn_{0.25}$.

14. The storage cell of claim 10, wherein the active material is $La_{0.8}Ce_{0.2}Ni_{4.7}Co_{0.4}Sn_{0.25}$.

15. The storage cell of claim 10, wherein the active material is $La_{0.8}Nd_{0.2}Ni_{4.75}Co_{0.5}Sn_{0.25}$.

16. The storage cell of claim 10, wherein the active material is $La_{0.8}Ce_{0.2}Ni_{3.5}Co_{1.2}Sn_{0.25}$.

17. The storage cell of claim 10, wherein the active material is $La_{0.8}Zr_{0.2}Ni_{3.5}Co_{1.2}Sn_{0.25}$.

18. The storage cell of claim 10, wherein the active material is $MmNi_{4.8}Sn_{0.25}$.

19. The storage cell of claim 10, wherein the cathode comprises nickel oxide.

20. The storage cell of claim 10, wherein the electrolyte comprises an aqueous solution of KOH.

21. A composition of matter comprising the material $ANi_{x-y-z}Co_ySn_z$, wherein A is selected from mischmetal or $La_{1-w}M_w$, M is selected from the group Ce, Nd, Zr, and mixtures thereof, w is from about 0.05 to about 1.0, x is from about 4.5 to about 5.5, y is from 0 to about 3.0, and z is from about 0.05 to about 0.5.

22. The composition of matter of claim 21, wherein the composition of matter is $La_{0.8}Ce_{0.2}Ni_{4.8}Sn_{0.25}$.

23. The composition of matter of claim 21, wherein the composition of matter is $La_{0.8}Ce_{0.2}Ni_{4.7}Co_{0.4}Sn_{0.25}$.

24. The composition of matter of claim 21, wherein the composition of matter is $La_{0.8}Nd_{0.2}Ni_{4.75}Co_{0.5}Sn_{0.25}$.

25. The composition of matter of claim 21, wherein the composition of matter is $La_{0.8}Ce_{0.2}Ni_{3.5}Co_{1.2}Sn_{0.25}$.

26. The composition of matter of claim 21, wherein the composition of matter is $La_{0.8}Zr_{0.2}Ni_{3.5}Co_{1.2}Sn_{0.25}$.

27. The composition of matter of claim 21, wherein the composition of matter is $MmNi_{4.8}Sn_{0.25}$.

* * * * *